United States Patent
Sornes et al.

(10) Patent No.: US 11,232,611 B2
(45) Date of Patent: Jan. 25, 2022

(54) SYSTEM AND METHODS FOR REDUCING ANOMALIES IN ULTRASOUND IMAGES

(71) Applicant: GE Precision Healthcare LLC, Milwaukee, WI (US)

(72) Inventors: Anders Sornes, Oslo (NO); Erik Normann Steen, Moss (NO)

(73) Assignee: GE Precision Healthcare LLC, Milwaukee, WI (US)

( * ) Notice: Subject to any disclaimer, the term of this patent is extended or adjusted under 35 U.S.C. 154(b) by 294 days.

(21) Appl. No.: 16/598,966

(22) Filed: Oct. 10, 2019

(65) Prior Publication Data
US 2021/0110582 A1  Apr. 15, 2021

(51) Int. Cl.
G06K 9/00 (2006.01)
G06T 11/00 (2006.01)
G06N 3/04 (2006.01)
G06N 3/08 (2006.01)

(52) U.S. Cl.
CPC .............. *G06T 11/008* (2013.01); *G06N 3/04* (2013.01); *G06N 3/084* (2013.01)

(58) Field of Classification Search
CPC ......... G06T 11/008; G06T 2207/20048; G06T 5/002; G06T 2207/20084; G06T 2207/20081; G06T 2207/10132; G06N 3/04; G06N 3/084; G06N 3/0454; A61B 8/5215; A61B 8/5269
USPC .......................................... 382/131; 600/445
See application file for complete search history.

(56) References Cited

U.S. PATENT DOCUMENTS

| 2013/0243296 A1* | 9/2013 | Nandi ................. G01S 7/52044 382/131 |
| 2014/0219530 A1* | 8/2014 | Zalev .................. A61B 8/4444 382/131 |
| 2014/0276065 A1* | 9/2014 | He .......................... A61B 8/12 600/445 |

OTHER PUBLICATIONS

Backpropagation, Wikipedia Website, Available Online at https://en.wikipedia.org/wiki/Backpropagation, Available as Early as Feb. 27, 2004, 5 pages.
"Backpropagation," Deep AI Website, Available Online at https://deepai.org/machine-learning-glossary-and-terms/backpropagation, Available as Early as Oct. 17, 2018, 1 page.
Ul Hassan, M., "VGG16—Convolutional Network for Classification and Detection," Neurohive Website, Available Online at https://neurohive.io/en/popular-networks/vgg16/, Nov. 20, 2018, 13 pages.

* cited by examiner

*Primary Examiner* — Charlotte M Baker
(74) *Attorney, Agent, or Firm* — McCoy Russell LLP

(57) ABSTRACT

Methods and systems are provided for reducing anomalies in ultrasound images. One example method includes combining a plurality of sub-band components to attenuate anomalies in a first ultrasound image formed by the combination of the plurality of sub-band components, wherein the plurality of sub-band components are combined based on a plurality of adaptive weights output from a machine learning model and wherein the plurality of adaptive weights are associated with the plurality of sub-band components. The method further includes outputting for a display device, the first ultrasound image.

20 Claims, 9 Drawing Sheets

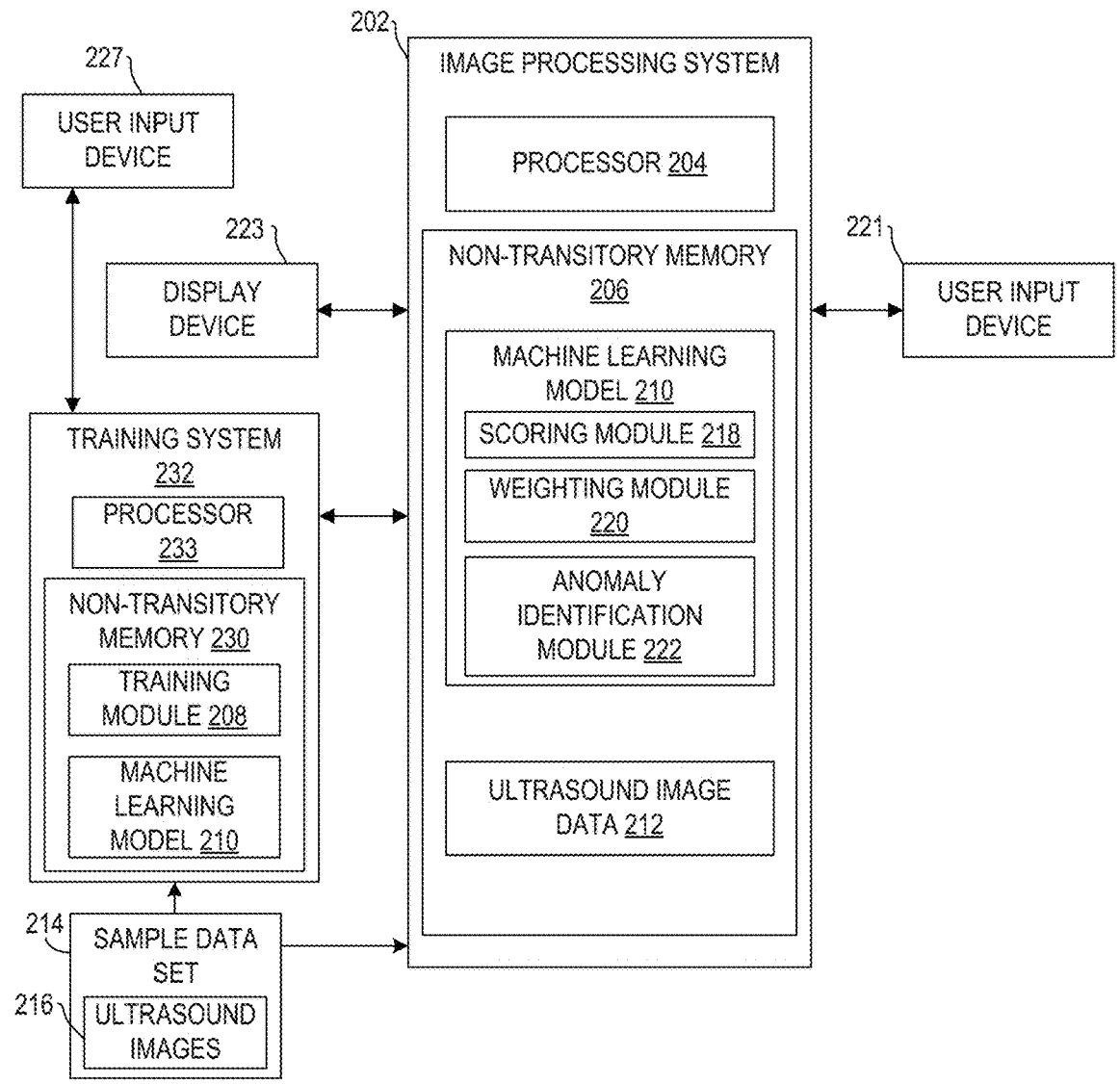
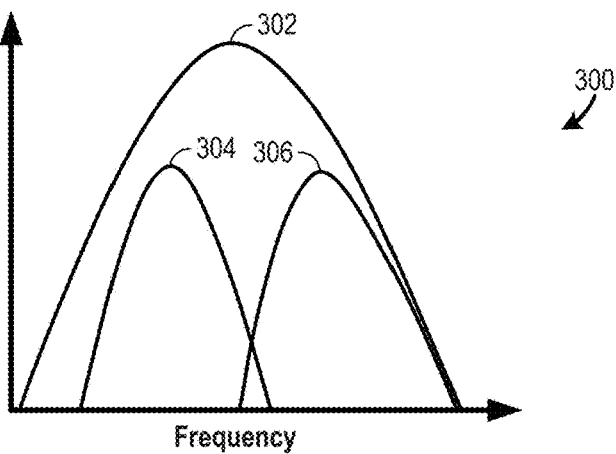

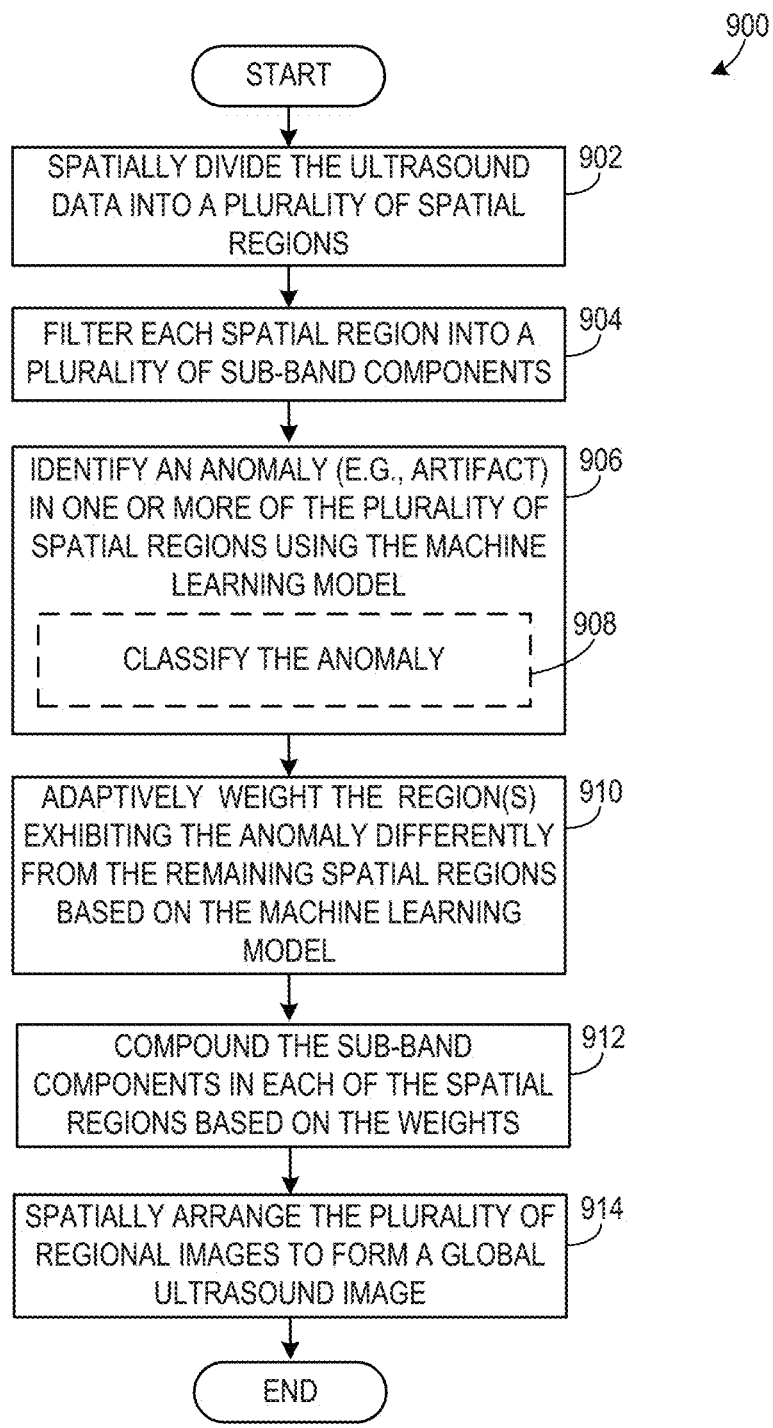

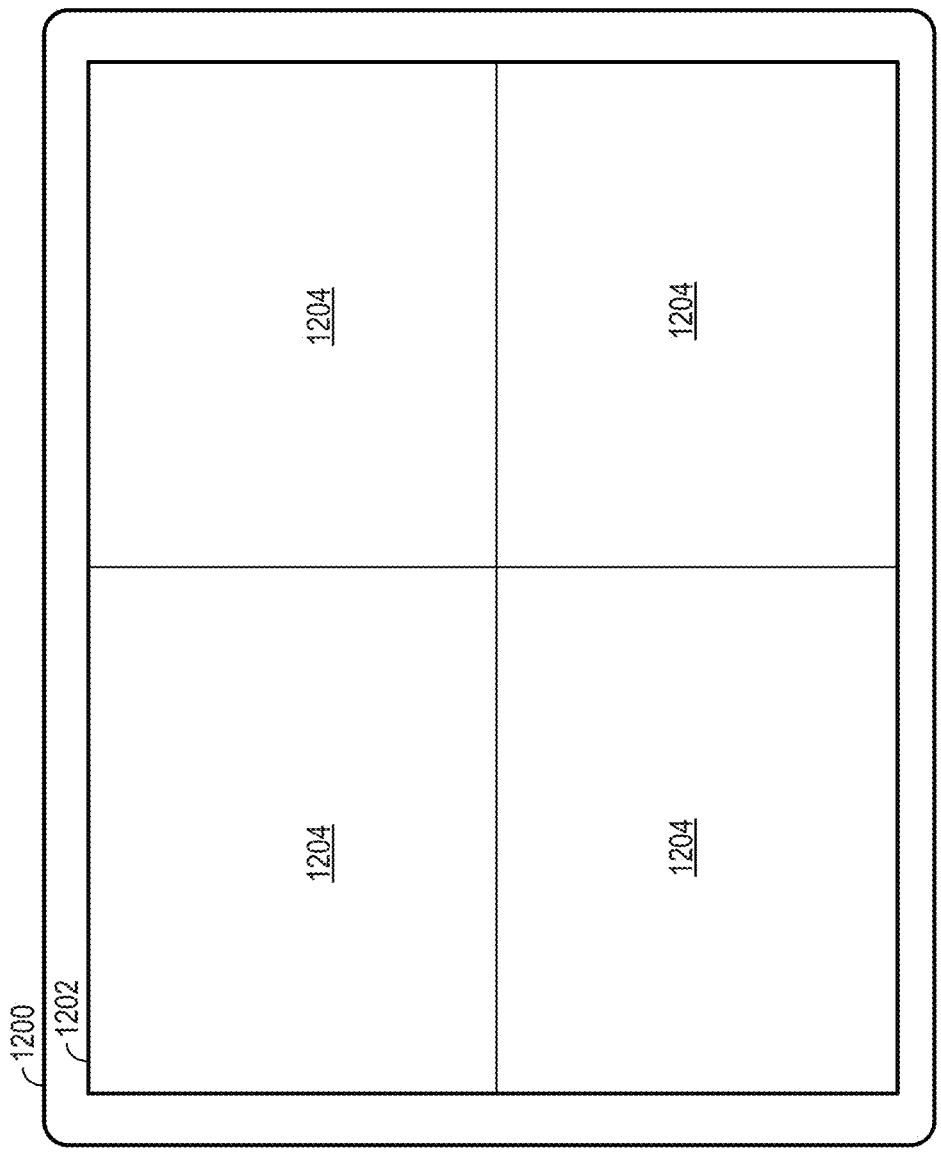

SYSTEM AND METHODS FOR REDUCING ANOMALIES IN ULTRASOUND IMAGES

TECHNICAL FIELD

Embodiments of the subject matter disclosed herein relate to ultrasound imaging, and more particularly, to systems and methods for reducing anomalies in ultrasound images.

BACKGROUND

Medical ultrasound is an imaging technique employing ultrasound waves to probe the internal structures (e.g., organs, tissue, bones, etc.) of a body of a patient and produce a corresponding image. For example, ultrasound machines may include a probe with a plurality of transducer elements emitting ultrasonic pulses. The pulses are reflected (e.g., echoed), refracted, or are absorbed by structures in the body. The ultrasound probe receives the reflected pulses and the machine processes the pulses to form an image. In some instances, presentation of ultrasound images of the internal structures on a display device occurs in real time or near real time, assisting a clinician during a medical procedure, for example.

SUMMARY

In one embodiment, a method is provided that comprises combining a plurality of sub-band components to attenuate anomalies in a first ultrasound image formed by the combination of the plurality of sub-band components. The plurality of sub-band components are combined based on a plurality of adaptive weights output from a machine learning model and wherein the plurality of adaptive weights are associated with the plurality of sub-band components. The method further includes outputting for a display device, the first ultrasound image.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which:

FIG. 2 is a schematic diagram illustrating an image processing system for processing ultrasound images, according to an exemplary embodiment;

FIG. 3 is a graphical depiction of sub-band filtering of ultrasound image data, according to an exemplary embodiment;

FIGS. 7-9 show different embodiment of more detailed ultrasound image processing methods, according to exemplary embodiments;

FIG. 12 shows an example ultrasound image partitioned into partial images, according to an exemplary embodiment.

DETAILED DESCRIPTION

Figure 1:
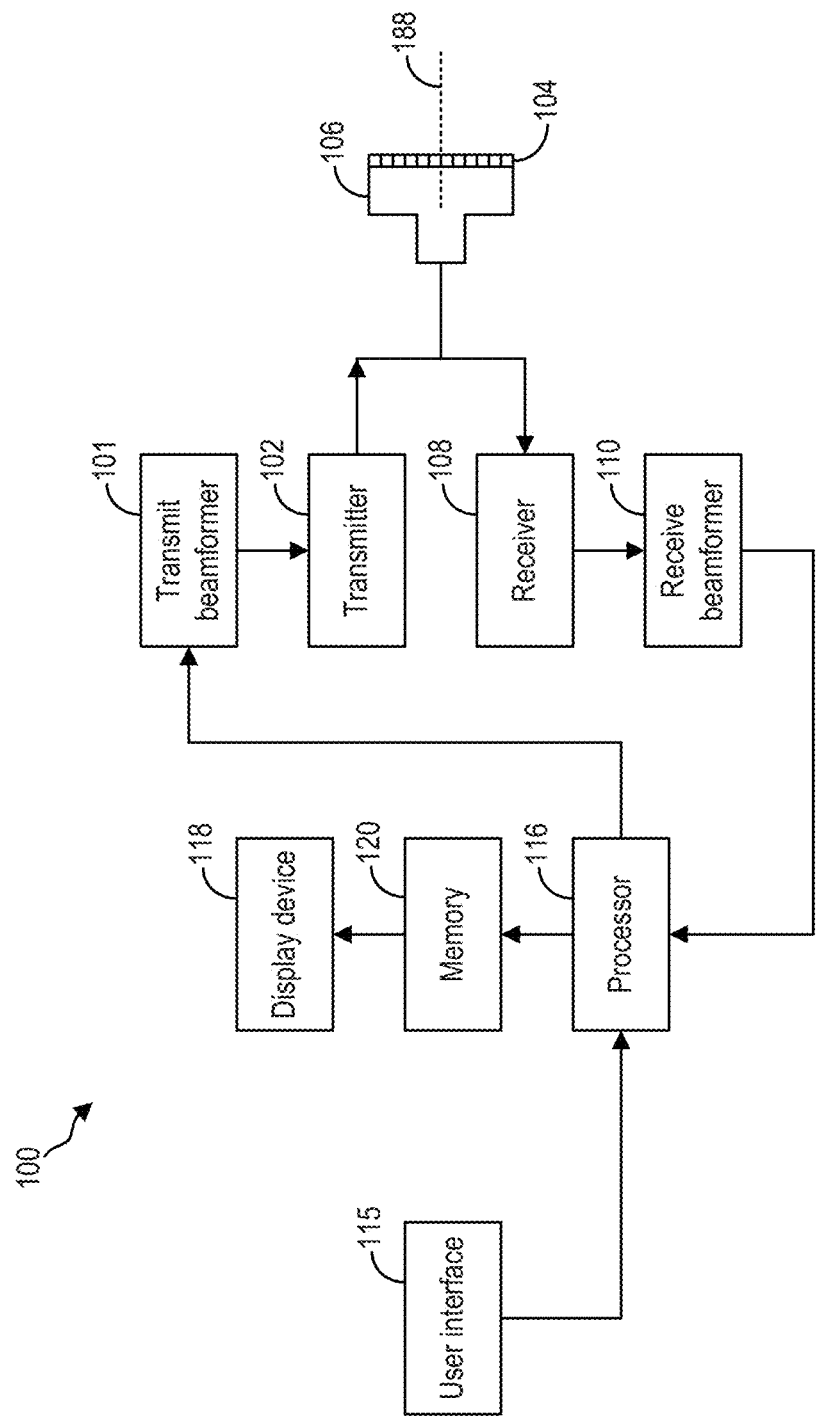
FIG. 1 shows a block diagram of an exemplary embodiment of an ultrasound system.

The following description relates to various embodiments for reducing artifacts and other anomalies in ultrasound images, such as frequency compounded ultrasound images. Ultrasound imaging may be used for viewing a patient's internal structures (e.g., organs, musculoskeletal structures, circulatory structures, etc.), to assist in performing various medical procedures. Frequency compounding (HD) is a technique deployed in certain ultrasound processing strategies where the echoes of a transmitted ultrasound pulse are filtered into different frequency sub-bands. Subsequently in the image processing chain, compounding of the different sub-band frequencies based on predetermined weights to form an ultrasound image occurs. Selection of the magnitudes of the predetermined weights may attempt to balance the acoustic properties of the different sub-bands. For instance, a lower frequency sub-band may penetrate deeper into the scanned subject while a higher frequency sub-band may have lower penetration but higher resolution characteristics.

However, in practice, image anomalies occur in HD ultrasound image processing due to unpredictable variability in the attenuation properties of different patients. For instance, predicting a subject's attenuation properties using their height, weight, and/or other external physical metrics may yield highly inaccurate results. In one use-case scenario, during harmonic imaging an amount of haze or clutter in the image may be dependent on the physical state of the scanned patient such as a distance between the chest and the ribs, intercostal spacing, etc., as well as the action (e.g., path, orientation, etc.) of the probe during the scan. If, for example, the presence of reverberations scattered off the patient's ribs is relatively high, it may be desirable to filter out a greater amount of a lower frequency sub-band. In other examples, when higher frequency sub-bands are not filtered out of the ultrasound image, artifact specific conditions, such as increased signal to thermal noise ratio, may occur, leading to a loss of body part structural information (e.g., the heart and/or other internal organs). A heightened chance of image anomaly formation during image processing diminishes the usefulness of the ultrasound images for diagnostics and other medical procedures.

According to embodiments described herein, a machine learning model (e.g., convolutional neural network (CNN)) may be trained using a sample data set having a plurality of ultrasound images with anomalies identified therein. As described herein an image anomaly is an unwanted and inaccurate image characteristic (e.g., image aberration, inaccurate structural detail, etc.) in an ultrasound image, such as an artifact, created during image processing. Following the training, the machine learning model is applied to sub-band components, where each component is individually filtered from ultrasound data. The model adaptively weights each sub-band component based on image quality scoring and/or the identification of anomalies in the sub-band component(s). Subsequently, the weighted sub-band components are combined to form an ultrasound image for presentation on a display device. In this way, sub-band frequencies are selectively attenuated to reduce and in some cases eliminate anomalies in the ultrasound image. Consequently, ultrasound image accuracy is increased, facilitating more accurate medical diagnostics and improvements in other medical procedures.

According to embodiments described herein, the sub-band components for a plurality of sub-regions of a global image may be adaptively weighted by the machine learning model, enabling more granular sub-band frequency suppression to further improve ultrasound image quality.

Figure 6:
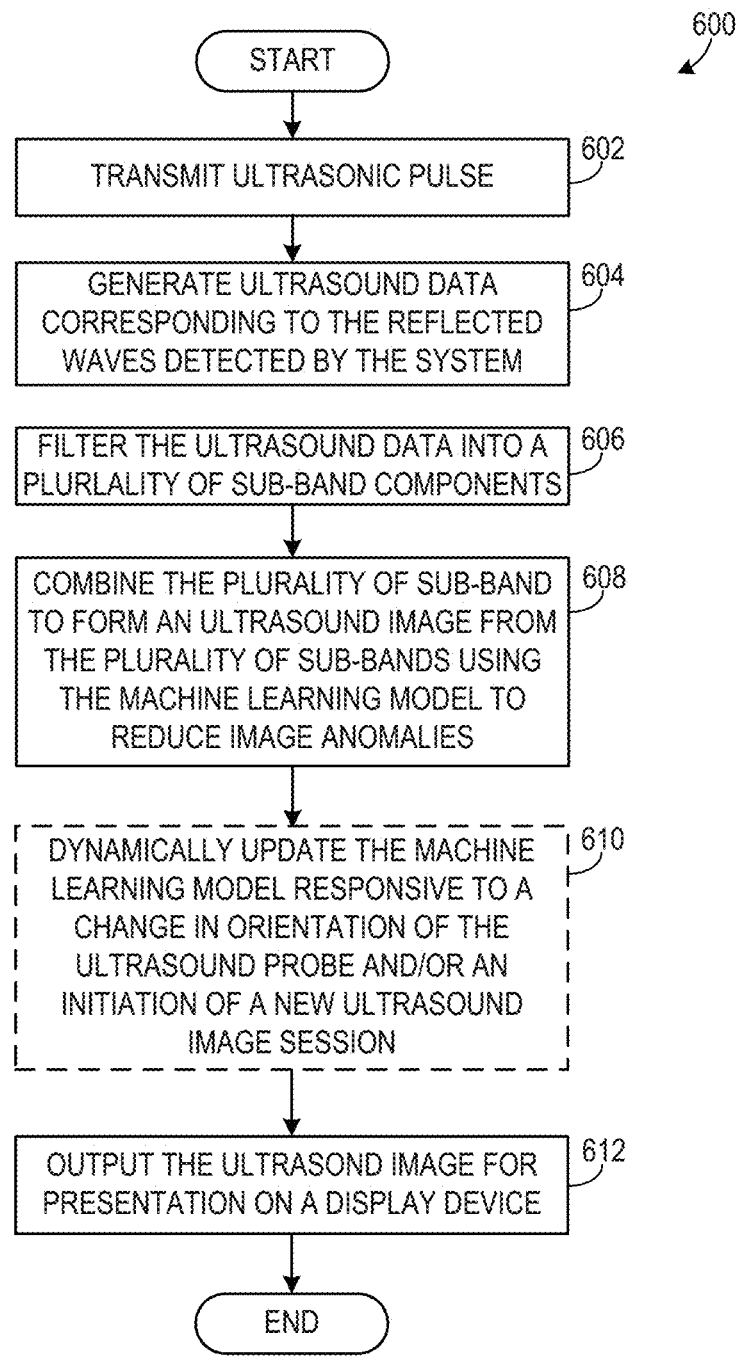
FIG. 6 is a high level method for processing an ultrasound image, according to an exemplary embodiment.
Figure 7:
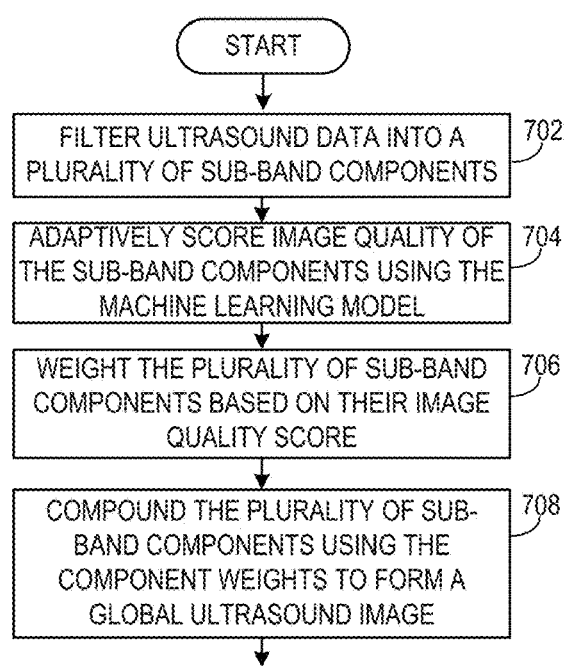
Figure 8:
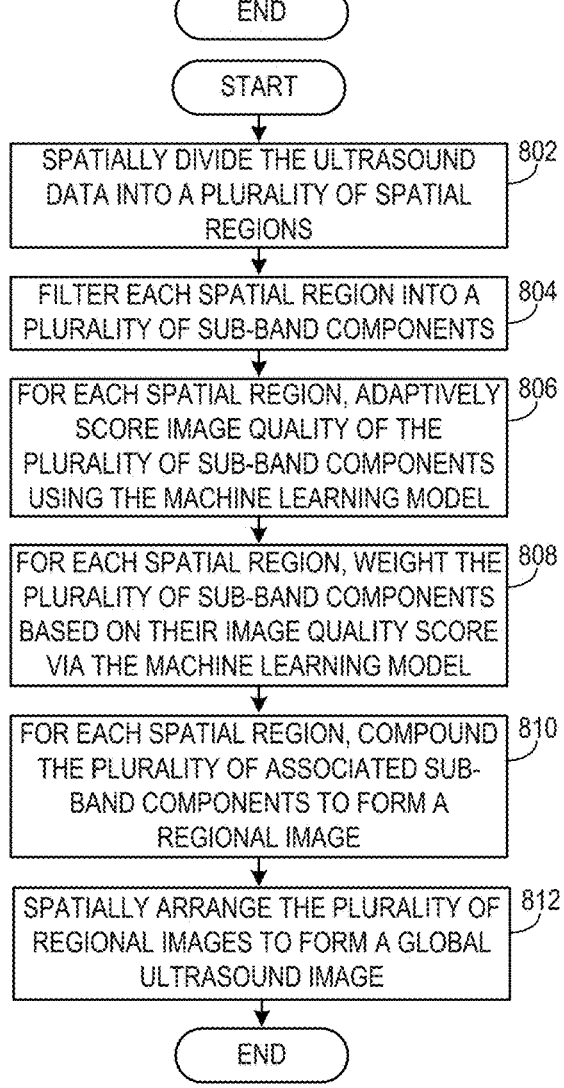
Figure 11:
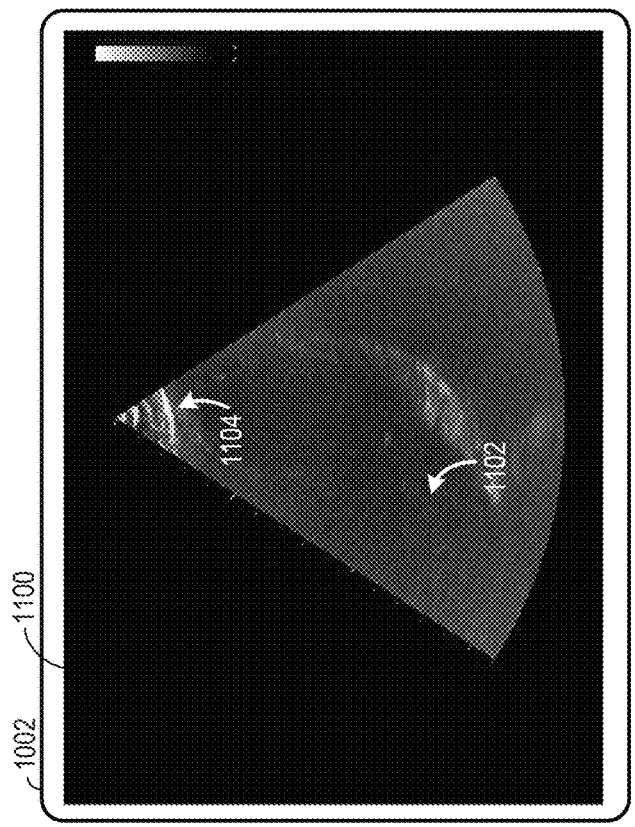
FIGS. 10 and 11 show two ultrasound images with identified anomalies, according to an exemplary embodiment.
Figure 10:
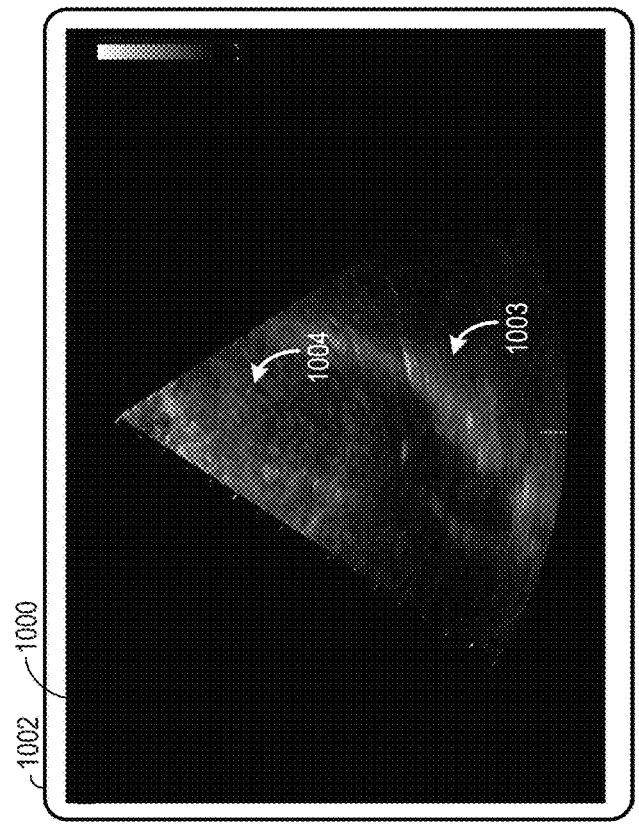

An example ultrasound system including an ultrasound probe, a display device, and an imaging processing system are shown in FIG. 1. Using the ultrasound probe, ultrasound data may be acquired and processed to form an ultrasound image with a reduced number of image anomalies which is presented on the display device. The reduction in image anomalies is achieved by deploying a trained machine learning model designed to adaptively score and weight sub-band frequency components of the image. The module for training the machine learning model as well as the model may be stored in and executed by the image processing system and/or training system, as shown in FIG. 2. An example of a sub-band filtering technique is graphically illustrated in FIG. 3. In some examples, the machine learning model may be trained using the process shown in FIG. 4 and ultrasound data may be processed for image forming using the parallel sub-band processing sequence shown in FIG. 5. FIG. 6 shows a high level example of an ultrasound image processing method. FIGS. 7-9 illustrate different embodiments of more detailed methods for ultrasound image processing. FIGS. 10-11 depict examples of global ultrasound images with identified anomalies. FIG. 12 shows an ultrasound image divided into sub-regions.

Referring to FIG. 1, a schematic diagram of an ultrasound imaging system 100 in accordance to an embodiment of the invention is shown. The ultrasound imaging system 100 includes a transmit beamformer 101 and a transmitter 102 that drives elements (e.g., transducer elements) 104 within a transducer array, herein referred to as probe 106, to emit pulsed ultrasonic signals (referred to herein as transmit pulses) into a body (not shown). According to an embodiment, the probe 106 may be a one-dimensional transducer array probe. However, in some embodiments, the probe 106 may be a two-dimensional matrix transducer array probe. As explained further below, the transducer elements 104 may comprise a piezoelectric material. When a voltage is applied to a piezoelectric crystal, the crystal physically expands and contracts, emitting an ultrasonic spherical wave. In this way, transducer elements 104 may convert electronic transmit signals into acoustic transmit beams.

After the elements 104 of the probe 106 emit pulsed ultrasonic signals 188 into a body (of a patient), the pulsed ultrasonic signals are back-scattered from structures within an interior of the body, like blood cells or muscular tissue, to produce echoes that return to the elements 104. The echoes are converted into electrical signals, or ultrasound data, by the elements 104 and the electrical signals are received by a receiver 108. The electrical signals representing the received echoes are passed through a receive beamformer 110 that outputs ultrasound data. Additionally, transducer element 104 may produce one or more ultrasonic pulses to form one or more transmit beams in accordance with the received echoes.

According to some embodiments, the probe 106 may contain electronic circuitry to do all or part of the transmit beamforming and/or the receive beamforming. For example, all or part of the transmit beamformer 101, the transmitter 102, the receiver 108, and the receive beamformer 110 may be situated within the probe 106. The terms "scan" or "scanning" may also be used in this disclosure to refer to acquiring data through the process of transmitting and receiving ultrasonic signals. The term "data" may be used in this disclosure to refer to either one or more datasets acquired with an ultrasound imaging system. In one embodiment, data acquired via ultrasound imaging system 100 may be used to train a machine learning model and/or be processed by the machine learning model. A user interface 115 may be used to control operation of the ultrasound imaging system 100, including to control the input of patient data (e.g., patient medical history), to change a scanning or display parameter, to initiate a probe repolarization sequence, and the like. The user interface 115 may include one or more of the following: a rotary element, a mouse, a keyboard, a trackball, hard keys linked to specific actions, soft keys that may be configured to control different functions, and a graphical user interface displayed on a display device 118.

The ultrasound imaging system 100 also includes a processor 116 to control the transmit beamformer 101, the transmitter 102, the receiver 108, and the receive beamformer 110. The processer 116 is in electronic communication (e.g., communicatively connected) with the probe 106. For purposes of this disclosure, the term "electronic communication" may be defined to include both wired and wireless communications. The processor 116 may control the probe 106 to acquire data according to instructions stored on a memory of the processor, and/or memory 120. The processor 116 controls which of the elements 104 are active and the shape of a beam emitted from the probe 106. The processor 116 is also in electronic communication with the display device 118, and the processor 116 may process the data (e.g., ultrasound data) into images for display on the display device 118. The processor 116 may include a central processor (CPU), according to an embodiment. According to other embodiments, the processor 116 may include other electronic components capable of carrying out processing functions, such as a digital signal processor, a field-programmable gate array (FPGA), or a graphic board. According to other embodiments, the processor 116 may include multiple electronic components capable of carrying out processing functions. For example, the processor 116 may include two or more electronic components selected from a list of electronic components including: a central processor, a digital signal processor, a field-programmable gate array, and a graphic board. According to another embodiment, the processor 116 may also include a complex demodulator (not shown) that demodulates the RF data and generates raw data. In another embodiment, the demodulation can be carried out earlier in the processing chain. The processor 116 is adapted to perform one or more processing operations according to a plurality of selectable ultrasound modalities on the data. In one example, the data may be processed in real-time during a scanning session as the echo signals are received by receiver 108 and transmitted to processor 116. For the purposes of this disclosure, the term "real-time" is defined to include a procedure that is performed without any intentional delay. For example, an embodiment may acquire images at a real-time rate of 7-20 frames/second (sec). The ultrasound imaging system 100 may acquire 2D data of one or more planes at a significantly faster rate. However, it should be understood that the real-time frame-rate may be dependent on the length of time that it takes to acquire each frame of data for display. Accordingly, when acquiring a relatively large amount of data, the real-time frame-rate may be slower. Thus, some embodiments may have real-time frame-rates that are considerably faster than 20 frames/sec while other embodiments may have real-time frame-rates slower than 7 frames/sec. The data may be stored temporarily in a buffer (not shown) during a scanning session and processed in less than real-time in a live or off-line operation. Some embodiments of the system may include multiple processors (not shown) to handle the processing tasks that are handled by processor 116 according to the exemplary embodiment described hereinabove. For example, a first processor may be utilized to demodulate and decimate the RF signal while a second processor may be used to further process the data, for example by augmenting the data as described in detail herein, prior to displaying an image. It should be appreciated that other embodiments may use a different arrangement of processors.

The ultrasound imaging system 100 may continuously acquire data at a frame-rate of, for example, 10 Hertz (Hz) to 30 Hz (e.g., 10 to 30 frames/sec). Images generated from the data may be refreshed at a similar frame-rate on display device 118. Other embodiments may acquire and display data at different rates. For example, some embodiments may acquire data at a frame-rate of less than 10 Hz or greater than 30 Hz depending on the size of the frame and the intended application. A memory 120 is included for storing processed frames of acquired data. In an exemplary embodiment, the memory 120 is of sufficient capacity to store at least several seconds' worth of frames of ultrasound data. The frames of data are stored in a manner to facilitate retrieval thereof according to its order or time of acquisition. The memory 120 may comprise any known data storage medium.

In various embodiments of the present system, data may be processed in different mode-related modules by the processor 116 (e.g., B-mode, Color Doppler, M-mode, Color M-mode, spectral Doppler, Elastography, tissue velocity imaging (TVI), strain, strain rate, and the like) to form 2D or 3D data. For example, one or more modules may generate B-mode, color Doppler, M-mode, color M-mode, spectral Doppler, Elastography, TVI, strain, strain rate, and combinations thereof, and the like. As one example, the one or more modules may process color Doppler data, which may include traditional color flow Doppler, power Doppler, HD flow, and the like. The image lines and/or frames are stored in memory and may include timing information indicating a time at which the image lines and/or frames were stored in memory. The modules may include, for example, a scan conversion module to perform scan conversion operations to convert the acquired images from beam space coordinates to display space coordinates. A video processor module may be provided that reads the acquired images from a memory and displays an image in real time while a procedure (e.g., ultrasound imaging) is being performed on a patient. The video processor module may include a separate image memory, and the ultrasound images may be written to the image memory in order to be read and displayed by display device 118.

In various embodiments, one or more components of ultrasound imaging system 100 may be included in a portable, handheld ultrasound imaging device. For example, display device 118 and user interface 115 may be integrated into an exterior surface of the handheld ultrasound imaging device, which may further contain processor 116 and memory 120. Probe 106 may comprise a handheld probe in electronic communication with the handheld ultrasound imaging device to collect raw ultrasound data. Transmit beamformer 101, transmitter 102, receiver 108, and receive beamformer 110 may be included in the same or different portions of the ultrasound imaging system 100. For example, transmit beamformer 101, transmitter 102, receiver 108, and receive beamformer 110 may be included in the handheld ultrasound imaging device, the probe, and combinations thereof.

After performing a two-dimensional ultrasound scan, a block of data comprising scan lines and their samples is generated. After back-end filters are applied, a process known as scan conversion is performed to transform the two-dimensional data block into a displayable bitmap image with additional scan information such as depths, angles of each scan line, and so on. During scan conversion, an interpolation technique is applied to fill missing holes (i.e., pixels) in the resulting image. These missing pixels occur because each element of the two-dimensional block should typically cover many pixels in the resulting image. For example, in current ultrasound imaging systems, a bicubic interpolation is applied which leverages neighboring elements of the two-dimensional block. As a result, if the two-dimensional block is relatively small in comparison to the size of the bitmap image, the scan-converted image will include areas of poor or low resolution, especially for areas of greater depth.

Ultrasound images acquired by ultrasound imaging system 100 may be further processed. In some embodiments, ultrasound images produced by ultrasound imaging system 100 may be transmitted to an image processing system where in some embodiments, the ultrasound images may be divided into sub-bands and weighted based on image quality using a machine learning model trained using ultrasound images. The weighted output from the machine learning model may be a ground truth output. As used herein, ground truth output refers to an expected or "correct" output based on a given input into a machine learning model. For example, if a machine learning model is being trained to identify a blooming anomaly, the ground truth output for the model, when fed an image with a blooming anomaly, is the identification of a region with the label "blooming anomaly," for example.

Although described herein as separate systems, it will be appreciated that in some embodiments, ultrasound imaging system 100 includes an image processing system. In other embodiments, ultrasound imaging system 100 and the image processing system may comprise separate devices. In some embodiments, images produced by ultrasound imaging system 100 may be used as a training data set for training one or more machine learning models, wherein the machine learning models may be used to perform one or more steps of ultrasound image processing, as described below. However, in other embodiments data for model training may be procured from other sources.

Referring to FIG. 2, image processing system 202 is shown, in accordance with an exemplary embodiment. In some embodiments, image processing system 202 is incorporated into the ultrasound imaging system 100. In some embodiments, at least a portion of image processing system 202 is disposed at a device (e.g., edge device, server, etc.) communicably coupled to the ultrasound imaging system via wired and/or wireless connections. In some embodiments, at least a portion of image processing system 202 is disposed at a separate device (e.g., a workstation) which can receive images/maps from the ultrasound imaging system or from a storage device which stores the images/data generated by the ultrasound imaging system. Image processing system 202 may be operably/communicatively coupled to a user input device 221 and a display device 223.

Image processing system 202 includes a processor 204 configured to execute machine readable instructions stored in non-transitory memory 206. Processor 204 may be single core or multi-core, and the programs executed thereon may be configured for parallel or distributed processing. In some embodiments, the processor 204 may optionally include individual components that are distributed throughout two or more devices, which may be remotely located and/or configured for coordinated processing. In some embodiments, one or more aspects of the processor 204 may be virtualized and executed by remotely-accessible networked computing devices configured in a cloud computing configuration.

Non-transitory memory 206 may store a machine learning model 210 and ultrasound image data 212. Additionally, a training module 208 is shown stored in non-transitory memory 230 of a training system 232. An instance of the machine learning model 210 is also shown stored in the non-transitory memory 230. The training system 232 may include an interactive computing device (e.g., workstation), server, input devices, combinations thereof, etc., that is remote from the image processing system 202. However, in other embodiments the training module 208 may be additionally or alternatively stored in the non-transitory memory 206 of the image processing system 202. For example, the features of the training system 232 may be incorporated into the image processing system 202, in some examples.

The training module 208 includes instructions for training the machine learning model 210 such as training routines, parameters associated with the machine learning model, etc. The routines in the training module may utilize a sample data set 214 having ultrasound images 216. The sample data set may be uploaded to the training system 232 via a portable drive (e.g., USB drive), a network (e.g., the Internet, local area network, and the like), etc. Therefore, the non-transitory memory 230 of the training system 232 may store the sample data set 214 received from one or more external sources (e.g., medical and/or academic databases, medical and/or academic networks, and the like). In some examples, the sample data set 214 may additionally or alternatively be sent to the image processing system 202 and stored in the memory 206 therein. The sample data set 214 includes the plurality of ultrasound images 216 used by the training module for model training. For instance, the sample data set 214 may include ultrasound images from a plurality of sources (e.g., hospitals, databases, etc.). The ultrasound images may each be divided into two or more sub-bands, in one example. To elaborate, each of the plurality of ultrasound images 216 may be subdivided into sub-band components forming a global image. In the global ultrasound image the sub-band components maintain a common spatial relationship, similar to a color image having three components (e.g., red, green, and blue), for instance. Users, such as experts, may in one example be given the opportunity to manually adjust the sub-bands of each image to generate a desired weighting for each image corresponding to a desired image quality (e.g., ideal or near ideal image quality) of the image. A higher image quality may denote a smaller number of anomalies (e.g., artifacts) in the image while a lower image quality may denote a greater number of anomalies in the image. An expert may be a person (e.g., clinician, medical professional, supervisor, etc.) having knowledge, obtained educationally and/or professionally for example, enabling them to judge ultrasound image quality and/or determine image anomalies. However, in other examples, the ultrasound images 216 in the sample data set 214 may be sent to the training system and/or image processing system with images whose sub-bands already have a weighting corresponding to a desired image quality. After the images in the sample data set have weights indicating a desired image quality the training module 208 may use the sample data set for machine learning model training, described in greater detail herein.

Additionally or alternatively, the sample data set 214 may include pre-identified anomalies (e.g., artifacts) when the data set is received by the training system 232. However, in other examples, users of the training system 232 may be given the images for anomaly identification, similar to the abovementioned sub-band weighting process carried out by system users. For example, during an anomaly identification (e.g., labelling) phase a user (e.g., expert) may identify an artifact by drawing a contour around the artifact or bounding the artifact via a predetermined geometric shape (e.g., rectangle, triangle, etc.). The boundaries (e.g., line drawn by the user, rectangle, etc.) are then stored together with a label identifying the anomaly (e.g., artifact). The label may be selected or otherwise input by the user. In this way, the anomalies (e.g., artifacts) may also be classified by system users. However in other examples, the data set may include pre-classified artifacts. The anomaly classification scheme may use one or more of the following categories, types, etc., of artifacts for classification: artifacts that are expected to differ significantly between sub-bands, such as: reverberation or clutter artifacts (haze), blooming artifacts, thermal noise artifacts (loss/weakening of structural information vs thermal noise), beam width/side lobe artifacts; but also other types of artifacts that more indirectly are affected by receive band selection, such as: acoustic enhancement, acoustic shadowing, comet tail artifact and/or ring down artifact. The identified anomalies in the sample data set may be used by the training module 208 for machine learning model training.

Additionally, in some example, each image in the sample data set 214 may have a "view" indicating a position and orientation of the probe associated with the image. The view data may be manually specified by a user, in one example. However, in other examples the view data may be automatically detected by a separate neural network (e.g., view detection network) which may be stored in the training system 232. The views associated with the plurality of images 216 in the sample data set 214 may also be used by the training module 208 for machine learning model training, in one example.

The training module 208 comprises instructions for training the machine learning model 210. As previously discussed, an instance of the machine learning model 210 may also be stored in the memory 230 of the training system 232. The training module 208 and machine learning model 210 are shown as distinct memory constituents. However, in other examples, the training module 208 may be stored within the machine learning model 210. Training module 208 may include instructions that, when executed by processor 233, cause the training system 232 to conduct one or more of the steps of process 400, discussed in more detail below. Generally, the model is trained to output compounded images formed from sub-bands having fewer anomalies and therefore higher image quality. When the sample data set 214 includes identified anomalies, in the training phase, the machine learning model may be trained to identify different artifacts. An object detection network such as a U-net may be used for this purpose, in one example. However, other suitable detection networks have been envisioned.

It will be appreciated that the training system 232 may send the trained machine learning model 210 to the image processing system 202, when model training is completed. Specifically, in some examples, the training system 232 may send (e.g., periodically send) machine learning model updates to the image processing system 202 responsive to the training system updating the model.

After the training, the machine learning model 210 is prepared to adaptively score image quality and weight sub-band components in an ultrasound image based on the scores for artifact attenuation. To elaborate, the scoring and weighting modules 218 and 220 provide the scoring and weighting functionality in the model. Subsequently, the sub-bands are recombined (e.g., compounded) to form an image with fewer anomalies and increased image quality. Decreasing anomalies allows medical professionals and other users of the ultrasound system to increase diagnostic accuracy as well as achieve improvements in other medical procedures due to the ultrasound image more closely resembling the subject's internal structures.

In other examples, the machine learning model 210, using the anomaly identification module 222, may identify anomalies (e.g., artifacts) in the sub-band components and in some cases classify the anomalies and then adaptively weight the sub-band components using the identified and/or classified anomalies in order to attenuate the anomalies. For instance, in one use-case scenario, if an anomaly is identified in a lower right quadrant of an image and is associated with a high frequency sub-band. In other words, the high frequency sub-band creates and/or amplifies the artifact. The high frequency sub-band of the lower right image quadrant may be given a relatively smaller weight while the upper quadrants and lower left quadrant will correspondingly be given relatively larger weights.

Subsequent to the weighting, the sub-band components may combined (e.g., compounded) to form a global ultrasound image. As described herein a global ultrasound image embodies a breadth of the echoed wave field received by the ultrasound probe.

To achieve the image scoring and weighting and/or anomaly identification functionality, the machine learning model 210 may include networks, such as deep learning networks, comprising a plurality of weights and biases, activation functions, loss functions, gradient descent algorithms, and instructions for implementing the one or more deep neural networks to process input ultrasound images. Therefore, the machine learning model 210 may include trained and/or untrained neural networks and parameters (e.g., weights, scoring functions, biases, etc.) associated with one or more neural network models stored therein. The machine learning model 210 may output scores and weights associated with image quality of an ultrasound image. For example, the machine learning model 210 may store instructions for implementing a neural network, such as an artificial neural network (e.g., a convolutional neural network (CNN) (e.g., VGG16), a residual neural network (ResNet) (e.g., ResNet 50, ResNet 18, and the like), etc.). The neural network may therefore, in some embodiments, pass images through a stack of convolutional layers where convolutional filters acting as a linear transform, maxpooling operation, etc., are applied to/carried out on the images and provide a weight value output for each image sub-band. However, numerous suitable neural network processing schemes allowing for the output of weighted sub-band values, have been envisioned.

The machine learning model 210 may, in some embodiments, dynamically update the adaptive weighting scheme for the different sub-bands continuously with a fixed time interval between updates, responsive to a change in orientation of the ultrasound probe and/or initiation of a new ultrasound image session corresponding to a different patient. In such an example, the training data set will include a probe location and orientation (e.g., a "view" in the ultrasound context) associated with each image and the probe orientation variable may be incorporated into the model. In this way, the weighting technique can be adaptively updated to account for different positions of a patient's internal sub-structures (e.g., internal organs) positions and therefore echo characteristics of different patients to achieve even greater improvements in image quality. A new imaging session may be defined as a system changeover where scanning of one patient has been discontinued and scanning of a new patient commences.

Non-transitory memory 206 may further store ultrasound image data 212, such as ultrasound images captured by the ultrasound imaging system of FIG. 1. For example, ultrasound image data 212 may store ultrasound images, ground truth output, sub-band scoring and weighting, identified anomalies, iterations of machine learning model output, and other types of ultrasound image data. In some embodiments, ultrasound image data 212 may store ultrasound images and ground truth outputs in an ordered format, such that each ultrasound image is associated with one or more corresponding ground truth outputs.

In some embodiments, the non-transitory memory 206 may include components disposed at two or more devices, which may be remotely located and/or configured for coordinated processing. In some embodiments, one or more aspects of the non-transitory memory 206 may include remotely-accessible networked storage devices configured in a cloud computing configuration.

User input device 221 may comprise one or more of a touchscreen, a keyboard, a mouse, a trackpad, a motion sensing camera, or other devices configured to enable a user to interact with and manipulate data within image processing system 31. In one example, user input device 221 may enable a user to make a selection of an ultrasound image for further processing using a trained machine learning model. In another example, a user input device 227 (e.g., touchscreen, keyboard, mouse, etc.) may enable a user to manually adjust weighting of images prior to model training, select images used by the training module 208, etc.

Display device 223 may include one or more display devices utilizing virtually any type of technology. In some embodiments, display device 223 may comprise a computer monitor, and may display ultrasound images. Display device 223 may be combined with processor 204, non-transitory memory 206, and/or user input device 221 in a shared enclosure, or may be peripheral display devices and may comprise a monitor, touchscreen, projector, or other display device known in the art, which may enable a user to view ultrasound images produced by an ultrasound imaging system, and/or interact with various data stored in non-transitory memory 206.

Image processing system 202 shown in FIG. 2 is illustrative, not for limitation. Another appropriate image processing system may include more, fewer, and/or different components.

FIG. 3 shows a graphical depiction of a technique for dividing ultrasound data, detected by the probe, into a plurality of sub-band components. It will be understood that the sub-band division may be carried out by the ultrasound imaging system 100, training system 232, and/or the image processing system 200, shown in FIGS. 1 and 2, respectively.

The graph 300 indicates frequency on the abscissa and frequency magnitude is on the ordinate. Plot 302 corresponds to the ultrasonic pulse (e.g., broad band ultrasonic pulse) transmitted by the probe. Plot 304 is a first sub-band component of echoed waves received by the probe and plot 306 is a second sub-band component of the waves received by the probe. Thus, the first and second sub-band components correspond to different frequency ranges of waves from the transmitted pulse reflected off the subject being scanned. As such, the sub-bands may at least approximately cover the extent of the ultrasonic pulse's field. The first sub-band frequency range slightly overlaps with the second sub-band frequency range, in the illustrated embodiment. However, in other examples, the sub-band ranges may not overlap. Although two sub-band components (e.g., a higher and lower sub-band) are illustrated, it will be appreciated that the echoes may be parsed into a greater number of sub-bands. For instance, there may be a low sub-band, a mid-band, and a high-band, in one example. In other examples, four or more sub-bands may be used.

Figure 4:
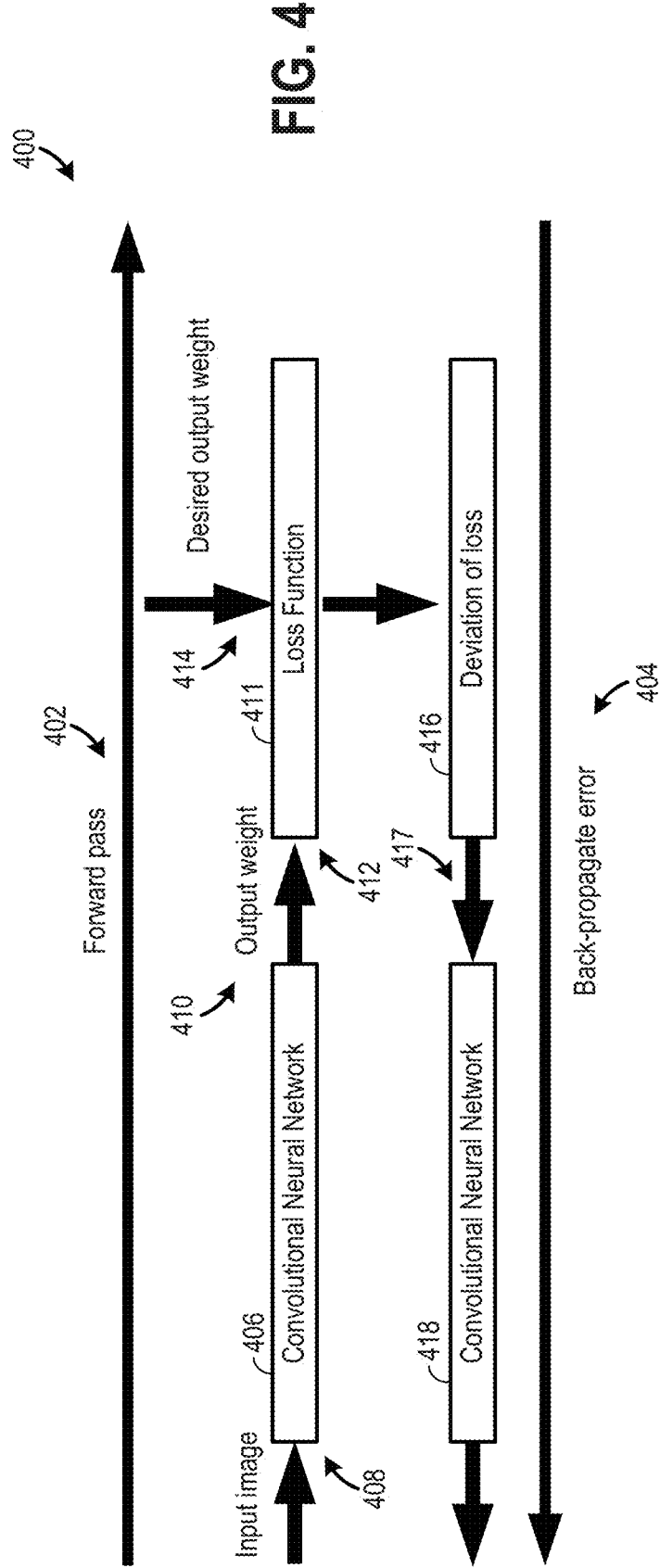
FIG. 4 is a block diagram of a training process for a machine learning model, according to an exemplary embodiment.

Turning to FIG. 4 showing an embodiment of a process 400 for training the machine learning model 210, shown in FIG. 2. Therefore, the convolutional neural network (CNN) 406 is an example of the machine learning model 210, shown in FIG. 2. The process 400 shown in FIG. 4 is exemplary in nature and it will be appreciated that other model training processes have been envisioned such as training techniques where artifacts are separately identified. An artifact identification training process is described in greater detail herein.

The process 400 is shown including a forward pass 402 and a back-propagating error 404 used to identify model errors for increasing the accuracy of the model's output. The back propagating error 404 calculates the gradient of descent for weighting the model's output. The errors are then distributed through the network's layers in a backwards fashion.

In the forward pass, an image is input into the CNN 406 or other suitable type of machine learning model at 408. After being fed the image, the CNN outputs a weight at 410. The CNN may score sub-bands in the image data and then generate the weights of the sub-bands using the scores.

At 412, the output weight is then fed into a loss function 411. The loss function 411 maps the output weights from the CNN to desired output weights input into the loss function at 414. The desired output weights may be the weights generated by users through manual sub-band weighting control.

The output of the loss function may be expressed as a deviation of loss (e.g., cost value) at 416. The deviation of loss is then fed back into another instance of a CNN 418 to carry out back propagation error at 417. As such, the CNN can be trained and updated to improve the weighting scheme to reduce image anomalies. Each image in the sample data set may be processed using the technique shown in FIG. 4.

Figure 5:
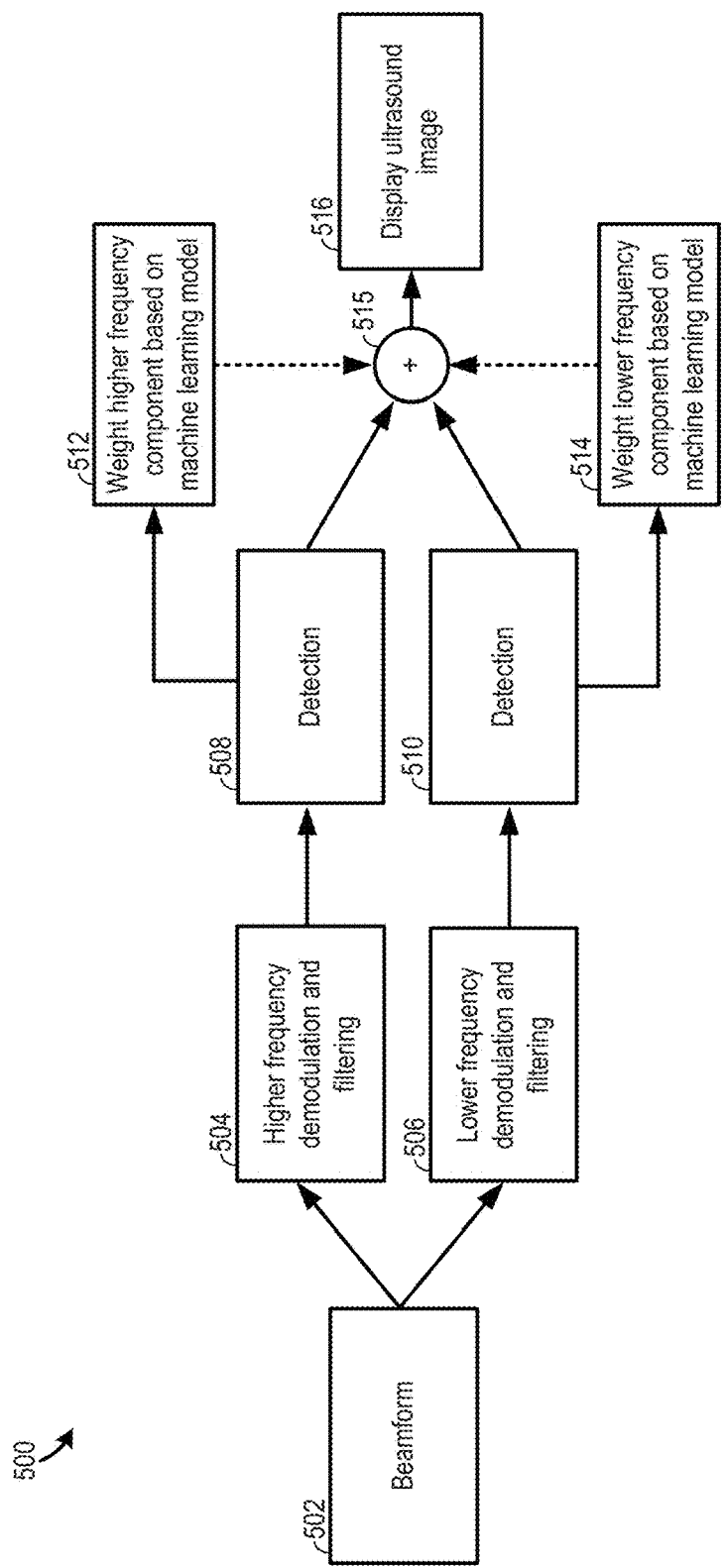
FIG. 5 is a block diagram of an ultrasound image processing sequence, according to an exemplary embodiment.

FIG. 5 illustrates a block diagram 500 of an ultrasound image processing sequence that may take place subsequent to training of the machine learning model. The image processing sequence shown in FIG. 5 may be implemented using the ultrasound imaging system 100 and/or the image processing system 200, shown in FIGS. 1 and 2, respectively.

At 502, beamforming of image data obtained from an ultrasound probe implemented. Beamforming may include, adjusting parameters of echo data received from the ultrasound probe to form an image. To elaborate, amplitude and/or phase of signals may be adjusted to create a desired interference pattern. The interference pattern may be formed taking into account parameters such as lateral and axial resolutions, depth of field, contrast, frame rate, combinations thereof, etc. However, a variety of beamforming techniques have been envisioned.

Subsequent to beamforming, the beamformed image data is divided using higher frequency demodulation and filtering at 504 and lower frequency demodulation and filtering at 506. In this way, the beamformed image data is subdivided into a plurality of sub-bands. Although, the use-case example in FIG. 5 only subdivides the image data into a higher and lower sub-band, it will be understood that the image data may be subdivided into three or more sub-bands, in other examples. Demodulation and filtering the beamformed image data may include passing the data through high-pass, low-pass, and/or band-pass filters to subdivide the image. When subdividing the higher and lower sub-band components may retain a common spatial relationship. For instance, the sub-band components may share a common origin point as well as a common spatial boundary, in some cases.

Next at 508 and 510, detection is carried out on the higher frequency sub-band component and the lower frequency sub-band component, respectively. Specifically, in one embodiment quadrature (IQ) detection may be carried out on both the higher and lower frequency sub-band image components. The quadrature detection method may mix an in-phase and quadrature-phase sinusoid with an input signal (i.e., the corresponding sub-band component). However, other detection processing techniques may be utilized, in other embodiments.

At 512, the higher frequency sub-band component is weighted using the machine learning model. For instance, a deep learning network may classify the sub-band component according to a probability that the sub-band component does not have artifacts or other anomalies. At 514, the lower frequency sub-band component is correspondingly weighted using the machine learning model. Again, weighting the frequency sub-band may include using a deep learning network to generate a probability that the sub-band does not include an anomaly.

At 515, the weighted sub-band components are combined (e.g., compounded) to form a global ultrasound image based on the weighting of the different sub-band components. For example, a sub-band component with a higher probability of including an anomaly may be given a weight less than a weight of another sub-band component having smaller probability of anomaly. In this way, sub-bands with a greater chance of exhibiting anomalies may be suppressed to improve image quality. Combining the sub-band components may also include arranging the sub-band components in a common spatial position.

Subsequent to 515, the process may output the ultrasound image for display. Next, at 516, the global ultrasound image is presented on a display device.

FIG. 6 shows a high level method 600 for operating an ultrasound system. The method 600 as well as the other methods herein may be implemented by any of the systems, components, devices, etc., described above with regard to FIGS. 1-2. However, in other examples, the method 600 may be carried out by other suitable systems, components, devices, etc. Instructions for carrying out method 600 and/or the other methods described herein may be at least partially executed by a processor based on instructions stored in memory (e.g., non-transitory memory). Furthermore, the method 600 and the other image processing methods, techniques, etc., described herein may be carried out in real time or near real time to enable imaging diagnostics or other imaging interpolations to occur in tandem with subject scanning. Furthermore, method 600 may also occur successive to training of the machine learning model, such as the training process depicted in FIG. 4.

At 602, the method includes transmitting an ultrasonic pulse using an ultrasound probe. For instance, a user, such as a medical professional, may manipulate the ultrasound probe to transmit a pulse in the direction of a patient or other suitable subject. In certain embodiments, the ultrasound probe may have a specific spatial orientation and location (e.g., a view) that is determined by the system.

Next at 604, the method includes generating ultrasound data corresponding to the reflected (e.g., echoed) ultrasound pulse detected by the ultrasound system and specifically the probe. For instance, signals indicative of an echoed pulse detected and then generated by the ultrasound probe may be beamformed to produce ultrasound image data.

At 606, the method includes filtering the ultrasound data into a plurality of sub-band components. For instance, filters or other suitable techniques may be used to divide the image data into two or more sub-band components having a common spatial position.

Next at 608, the method includes combining (e.g., compounding) the plurality of sub-band components to form an ultrasound image from the plurality of sub-band components to reduce image anomalies. For instance, the model may output weighted sub-bands which favor sub-bands with fewer artifacts while suppressing sub-bands identified with a greater number of artifacts. The sub-bands have a common spatial position and are therefore combined while maintaining the predefined spatial positioning. In a use-case example, in a scan, higher frequency pulse components gradually deplete as the ultrasound waves traverse the subject. Therefore, during image compounding the model may attenuate a lower frequency component in a near field (e.g., shallower depth) where haze caused by reverberation would be more likely while emphasizing the low frequency component in a far field (e.g., greater depth), where the higher frequency components would not have enough penetration and instead reveal artifacts. More detailed methods for anomaly suppression in ultrasound image forming are shown in FIGS. 7-9, described in greater detail herein.

At 610, the method includes dynamically updating the machine learning model continuously with a fixed time period between updates (e.g., every second), responsive to a change in orientation (e.g., view) of the ultrasound probe and/or an initiation of a new ultrasound image session. For instance, weights in the machine learning model may be dynamically adjusted when a new ultrasound imaging session commences or when a medical professional adjusts the position and orientation of the probe to obtain a new view. It will be understood that in other examples, step 610 may be omitted from the method.

At 612, the method includes outputting the ultrasound image for presentation on a display device. For instance, a wired and/or wireless signal may be output by the system for a display monitored by a medical professional or other suitable user. Method 600 enables more accurate ultrasound images to be generated by the system, allowing for more confident diagnostics to be carried out by medical professionals.

FIG. 7 shows a detailed method 700 where sub-bands of a global ultrasound image are processed for anomaly reduction. At 702, the method includes filtering ultrasound data into a plurality of sub-band components. The ultrasound data corresponds to the breadth of echoed data received by the ultrasound probe. Again, sub-bands such as a higher frequency sub-band and a lower frequency sub-band may be used as a sub-division scheme and the components may have a common spatial relationship.

At 704, the method includes adaptively scoring the image quality of each of the plurality of sub-band components using the machine learning model. The sub-band component score indicates the likelihood of one or more anomalies being present in the sub-band component. Thus, a higher image quality score may indicate a lesser number of image anomalies while a smaller image quality score may indicate a greater number of image anomalies.

At 706, the method includes weighting the sub-band components based on the scored image quality, using the machine learning model. For example, the scores from step 704 may be compared to generate weights assigned to each frequency sub-band component. For example, the weights may be ratios of a summation of the scores.

At 708, the method includes compounding the plurality of sub-band components using the sub-band component weights to form a global ultrasound image. As such, components with smaller weights are attenuated to reduce instances of anomalies in the global image. Method 700 allows images anomalies to be reduced in the image as a whole to again improve diagnostics and other medical procedures employing ultrasound imaging.

FIG. 8 shows a detailed method 800 for processing an ultrasound image in different spatial sections. At 802, the method includes subdividing the ultrasound image data into a plurality of spatial regions (e.g., partial-images). For instance, the ultrasound data may be subdivided into a plurality of rectangular tiles. In such an example, sequential tiles may be arranged next to one another, similar to a bitmap index, for instance. However, other schemes for geometrically dividing the image have been envisioned such as triangular sub-images, sub-images with varying shapes, etc. FIG. 12 shows an example, of a global image 1200 presented on a display 1202 that has been subdivided into sub-images 1204. Although, four sub-images are illustrated in FIG. 12, it will be understood that images with a larger number of sub-images have been envisioned.

At 804, the method includes filtering each spatial region into a plurality of sub-band components. Again, the sub-bands correspond to different frequency ranges. At 806, the method includes, for each spatial region, adaptively scoring each of the sub-band components using the machine learning model. The scores may again indicate a chance of the component containing or otherwise exhibiting one or more image anomalies.

At 808, the method includes, for each spatial region, weighting each of the scored sub-band components using the machine learning model. Again, the scored sub-bands may be compared (e.g., summed) to generate comparative weights. At 810, the method includes, for each spatial region, combining the associated sub-band components to form a regional image. For instance, the regional images may be one of the sub-images 1204 (e.g., quadrants), shown in FIG. 12.

Continuing with FIG. 8, at 812, the method includes spatially arranging the plurality of images to form a global ultrasound image. For example, when the spatial regions are rectangular in shape, adjacent rectangles may be placed next to one another to form an aggregate image. Again, referring to FIG. 12 as an example, the global image may be formed from the combination of the sub-images 1204. In this way, an aggregate image may be formed.

FIG. 9 shows a method 900 for ultrasound image processing where anomalies (e.g., artifacts) are identified and attenuated in a targeted manner. At 902, the method includes subdividing the ultrasound image data into a plurality of spatial regions (e.g., sub-images) and at 904, the method includes filtering each spatial region into a plurality of sub-band components, similar to steps 802 and 804.

Next at 906, the method includes identifying an anomaly in one or more of the plurality of spatial regions using the machine learning model. To elaborate, in one example, the machine learning model may identify one or more different artifacts with a probability value and this value may then used to determine the weights of the sub-bands. As previously discussed, when training data set include pre-identified artifacts, during training of the machine learning mode, the model may be trained via a suitable network, such as U-net.

Identifying the anomaly may include classifying the anomaly, at 908. The types of artifacts used in the classification may include blooming artifacts, reverberation artifacts and/or reduced structural signal vs thermal noise, as well as secondary effects like acoustic enhancement artifacts, acoustic shadowing, beam width/side lobe artifacts, and/or comet tail artifacts.

At 910, the method includes adaptively weighting the region(s) with the anomalies identified therein differently from the remaining spatial regions determined to be absent of anomalies. For example, an anomaly may be identified in a lower left quadrant of a global image. The anomaly may be classified as an artifact (e.g., blooming artifact) exacerbated by higher frequency components. In such an example, the higher frequency component in the lower left quadrant may be given a much lower weight than the lower frequency component in the lower left quadrant. In another example, a sub-band in a lower left image quadrant may be determined to have a greater number of anomalies than another sub-band in the lower left image quadrant. In such an example, the sub-band with the greater number of anomalies may be given a smaller weight than the other sub-band with fewer anomalies.

At 912, the method includes compounding the sub-band components in each of the spatial regions based on the weights. As such, the sub-bands are recombined with attenuated anomalies. At 914, the method includes spatially arranging the plurality of images to form a global ultrasound image. For example, when the spatial regions are rectangular in shape, adjacent rectangles may be placed adjacent to one another to form an aggregate image, similar to step 812. Method 900 allows more targeted anomaly suppression to be carried out in a regional manner, enabling further gains in image quality enhancement and specifically imaging accuracy to be achieved.

FIGS. 10 and 11 depict use-case examples of ultrasound images 1000 and 1100 presented on a display 1002 exemplifying artifacts and other anomalies that may be present in ultrasound images. The artifacts in the images may be suppressed by the image processing techniques described herein. The display 1002 is an example of the display device 118 in the ultrasound imaging system 100, shown in FIG. 1.

Specifically, FIG. 10 shows an image 1000 with the low frequency sub-band weight set too low, resulting in haze around the patient's substructures at 1003. Consequently, the patient's substructures appear fat and featureless. The low frequency sub-band deficiency also leads to reverberations and haze covering the apex at 1004. The image processing techniques employing the trained machine learning model described herein may therefore increase the weight of the low frequency sub-band in the image 1000 shown in FIG. 10 to reduce the haze and reverberation in the image.

FIG. 11 shows an image 1100 with the high frequency sub-band weight set too high, resulting in some of the patient's structures being partially invisible in the fluctuating noise at 1102. Strong reflectors of the high frequency sub-band also lead to blooming artifacts indicated at 1104. The image processing techniques employing the trained machine learning model described herein may decrease the weight of the high frequency sub-band to attenuate (e.g., eliminate) the blooming artifact and provide more visibility of the subject's structures.

A technical effect of using a machine learning model to reduce anomalies (e.g., artifacts) in an ultrasound image generated by an ultrasound system is to increase the image's accuracy with regard to the portrayal of a subject's underlying structures via a reduction in artifacts. Increasing image accuracy enables more confident diagnostics to be performed by system users, such as medical professionals.

In another representation, an ultrasound image processing method is provided that includes in a processing sequence, subsequent to beamforming, using a convolutional neural network, analyzing a plurality of ultrasound image frequency sub-bands to determine a probability of the frequency sub-bands including an artifact and recombining the plurality of analyzed frequency sub-bands using a sum of the probabilities to form an ultrasound image output for presentation on a display in the ultrasound system.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features. As described herein "approximately" refers to a values of within plus or minus five percent, unless otherwise noted.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A method comprising:
combining a plurality of sub-band components to attenuate anomalies in a first ultrasound image formed by the combination of the plurality of sub-band components, wherein the plurality of sub-band components are combined based on a plurality of adaptive weights output from a machine learning model and wherein the plurality of adaptive weights are associated with the plurality of sub-band components; and
outputting for a display device, the first ultrasound image.

2. The method of claim 1, further comprising executing the machine learning model to score image quality of the plurality of sub-band components and wherein the scored image quality of the plurality of sub-band components correspond to the plurality of adaptive weights.

3. The method of claim 1, wherein the first ultrasound image is a first partial image in a global ultrasound image corresponding to a first region and wherein the global ultrasound image is an aggregate image comprising a plurality of partial images, the plurality of partial images including the first partial image.

4. The method of claim 3, further comprising spatially associating the first partial image with a second partial image corresponding to a second region of the global ultrasound image different from the first region to form the global ultrasound image.

5. The method of claim 1, further comprising, prior to combining the plurality of sub-band components, identifying an artifact in the first ultrasound image and wherein the plurality of adaptive weights attenuate the identified artifact.

6. The method of claim 5, wherein the first ultrasound image is a first partial image in a global ultrasound image corresponding to a first region.

7. The method of claim 5, further comprising, prior to combining the plurality of sub-band components, classifying the artifact with one of a plurality of artifact types and wherein the plurality of adaptive weights are adjusted based on the classified artifact prior to combining the plurality of sub-band components.

8. The method of claim 7, wherein the plurality artifact types include blooming artifacts, reverberation artifacts and/or reduced structural signal vs thermal noise, as well as secondary effects like acoustic enhancement artifacts, acoustic shadowing, beam width/side lobe artifacts, and/or comet tail artifacts.

9. The method of claim 1, wherein the plurality of sub-band components are combined subsequent to quadrature (IQ) detection of the plurality of sub-band components.

10. The method of claim 1, further comprising dynamically updating the plurality of adaptive weights responsive to a change in an orientation of an ultrasound probe changes and/or initiation of a new ultrasound image session.

11. The method of claim 1, wherein the plurality of sub-band components include a lower frequency sub-band component and a higher frequency sub-band component.

12. The method of claim 1, wherein the machine learning model is a trained convolutional neural network.

13. A system, comprising:
an ultrasound probe configured to emit an ultrasonic pulse and generate ultrasound image data corresponding to reflections of the ultrasonic pulse;
memory storing instructions; and
a processor electronically coupled to the memory and when executing the instructions is configured to:
filter the ultrasound image data into a plurality of sub-band components;
combine the plurality of sub-band components to attenuate anomalies in a first ultrasound image formed by the combination of the plurality of sub-band components, wherein the plurality of sub-band components are combined based on a plurality of adaptive weights output from a machine learning model and wherein the plurality of adaptive weights are associated with the plurality of sub-band components; and
output for a display device, the first ultrasound image.

14. The system of claim 13, wherein the processor when executing the instructions is configured to:
execute the machine learning model to score an image quality of the plurality of sub-band components and wherein the scored image quality of the plurality of sub-band components are used to determine the plurality of adaptive weights.

15. The system of claim 13, wherein the first ultrasound image is a first partial image in a global ultrasound image corresponding to a first region and wherein the global ultrasound image is an aggregate image comprising a plurality of partial images, the plurality of partial images include the first partial image, and the processor when executing the instructions is configured to:
spatially associate the first partial image with a second partial image corresponding to a second region of the global ultrasound image different from the first region to form the global ultrasound image.

16. The system of claim 13, wherein the processor when executing the instructions is configured to:
prior to combining the plurality of sub-band components, identify an artifact in the first ultrasound image and wherein the plurality of adaptive weights attenuate the identified artifact.

17. The system of claim 13, wherein the processor when executing the instructions is configured to:
dynamically update the plurality of adaptive weights responsive to a change in an orientation of an ultrasound probe and/or initiation of a new ultrasound image session.

18. A method comprising:
filtering ultrasound image data into a plurality of sub-band components;
in a machine learning model, adaptively scoring image quality of the plurality of sub-band components and weighting the plurality of the sub-band components using the image quality scoring;
compounding the plurality of weighted sub-band components to attenuate anomalies in a first ultrasound image formed from the plurality of weighted sub-band components; and
outputting for a display device, the first ultrasound image.

19. The method of claim 18, wherein the first ultrasound image is a global ultrasound image or a first partial image in an aggregate ultrasound image including a plurality of partial images and wherein the plurality of partial images include the first partial image.

20. The method of claim 18, further comprising, prior to filtering the ultrasound image data, training the machine learning model using a sample data set including a plurality of ultrasound images with a plurality of pre-identified anomalies.

\* \* \* \* \*